(12) United States Patent
Lo et al.

(10) Patent No.: US 10,546,195 B2
(45) Date of Patent: Jan. 28, 2020

(54) METHODS AND SYSTEMS FOR AUTOMATIC OBJECT DETECTION FROM AERIAL IMAGERY

(71) Applicant: GEOSAT Aerospace & Technology, Tainan (TW)

(72) Inventors: Cheng-Fang Lo, Tainan (TW); Zih-Siou Chen, Tainan (TW); Chang-Rong Ko, Tainan (TW); Chun-Yi Wu, Tainan (TW)

(73) Assignee: GEOSAT AEROSPACE & TECHNOLOGY INC., Tainan (TW)

( * ) Notice: Subject to any disclaimer, the term of this patent is extended or adjusted under 35 U.S.C. 154(b) by 66 days.

(21) Appl. No.: 15/367,975

(22) Filed: Dec. 2, 2016

(65) Prior Publication Data
US 2018/0157911 A1 Jun. 7, 2018

(51) Int. Cl.
*G06K 9/00* (2006.01)
*G06K 9/62* (2006.01)
(Continued)

(52) U.S. Cl.
CPC .......... *G06K 9/00657* (2013.01); *G01C 11/02* (2013.01); *G06T 2207/10032* (2013.01);
(Continued)

(58) Field of Classification Search
CPC ............. G06K 9/00657; G06K 9/4671; G06K 9/6267; G06K 9/6201; G06K 9/4652;
(Continued)

(56) References Cited

U.S. PATENT DOCUMENTS

| 7,212,670 B1 | 5/2007 | Rousselle et al. |
| 7,310,606 B2 | 12/2007 | Nemethy et al. |
| (Continued) | | |

FOREIGN PATENT DOCUMENTS

| JP | 2015-125092 A | 7/2015 |
| JP | 2015-152340 A | 8/2015 |

OTHER PUBLICATIONS

Zhang, Li, and Armin Gruen. "Multi-image matching for DSM generation from IKONOS imagery." ISPRS Journal of Photogrammetry and Remote Sensing 60.3 (2006): 195-211. (Year: 2006).*
(Continued)

*Primary Examiner* — Bobbak Safaipour
(74) *Attorney, Agent, or Firm* — Finnegan, Henderson, Farabow, Garrett & Dunner LLP

(57) ABSTRACT

Methods and systems for detecting objects from aerial imagery are disclosed. According to certain embodiments, the method may include obtaining a Digital Surface Model (DSM) image of an area. The method may also include obtaining a DSM image of one or more target objects. The method may further include detecting the target object in the area based on the DSM images of the area and the one or more target objects. The method may further include recognizing the detected target objects by artificial intelligence. The method may further include acquiring the positions of the recognized target objects. The method may further include calculating the number of the recognized target objects.

42 Claims, 13 Drawing Sheets
(7 of 13 Drawing Sheet(s) Filed in Color)

(51) Int. Cl.
*G06T 7/00* (2017.01)
*G06K 9/48* (2006.01)
*G06T 7/40* (2017.01)
*G01C 11/02* (2006.01)

(52) U.S. Cl.
CPC .............. *G06T 2207/20081* (2013.01); *G06T 2207/30242* (2013.01)

(58) Field of Classification Search
CPC .. G06K 9/3233; G06K 9/6268; G06K 9/6256; G06K 9/00711; G06K 9/0063; G01C 11/02; G06T 2207/30242; G06T 2207/20081; G06T 2207/10032; G06T 2207/30188; G06T 2207/20084; G06T 2207/10028; G06T 7/74; G06T 7/73
See application file for complete search history.

(56) References Cited

U.S. PATENT DOCUMENTS

| | | | |
|---|---|---|---|
| 8,655,070 B1* | 2/2014 | Yang | G06K 9/00657 382/100 |
| 8,737,720 B2 | 5/2014 | Mas et al. | |
| 9,041,711 B1* | 5/2015 | Hsu | G06T 17/20 345/420 |
| 9,367,743 B1* | 6/2016 | Haglund | G06K 9/0063 |
| 2005/0271264 A1* | 12/2005 | Ito | G06T 5/006 382/154 |
| 2005/0276443 A1 | 12/2005 | Slamani et al. | |
| 2007/0025595 A1* | 2/2007 | Koizumi | G01C 11/06 382/103 |
| 2008/0298638 A1 | 12/2008 | Miyazaki et al. | |
| 2009/0087029 A1* | 4/2009 | Coleman | G06K 9/00208 382/103 |
| 2010/0118053 A1* | 5/2010 | Karp | G01C 11/06 345/630 |
| 2011/0282578 A1* | 11/2011 | Miksa | G01C 11/04 701/532 |
| 2013/0222369 A1* | 8/2013 | Huston | G06T 17/00 345/419 |
| 2014/0300736 A1* | 10/2014 | Reitinger | G06T 7/80 348/144 |
| 2014/0362082 A1* | 12/2014 | Schpok | G06T 17/05 345/427 |
| 2015/0294168 A1* | 10/2015 | Artan | G06K 9/00838 382/104 |
| 2016/0063516 A1* | 3/2016 | Terrazas | G06Q 30/0201 705/7.29 |
| 2017/0076438 A1* | 3/2017 | Kottenstette | G06K 9/00637 |
| 2017/0124745 A1* | 5/2017 | Christ | G01C 11/04 |
| 2017/0147890 A1* | 5/2017 | Sano | G06K 9/00805 |
| 2017/0222903 A1* | 8/2017 | Karlsson | H04L 43/0864 |
| 2017/0223592 A1* | 8/2017 | Karlsson | H04W 36/08 |
| 2017/0317939 A1* | 11/2017 | Karlsson | H04L 47/24 |
| 2018/0025231 A1* | 1/2018 | Noh | G06K 9/00718 382/160 |
| 2018/0107900 A1* | 4/2018 | Takahashi | G06F 3/0488 |

OTHER PUBLICATIONS

Hua-Mei Chen et al., "Imaging for Concealed Weapon Detection," IEEE Signal Processing Magazine, pp. 52-61, Mar. 2005.

Mohammad Haghighat et al., "CloudID: Trustworthy cloud-based and cross-enterprise biometric identification," Expert Sys. w/ Applications, vol. 42, No. 21, pp. 7905-7916, 2015.

Shaparas Daliman et al., "Oil Palm Tree Enumeration Based on Template Matching," WVCASEA2015, Mar. 2015 (6 pages).

Mansur Muhammad Aliero et al., "The Usefulness of Unmanned Airborne Vehicle (UAV) Imagery for Automated Palm Oil Tree Counting," Journal of Forestry, vol. 1, pp. 1-12, Dec. 2014.

Helmi Z. M. Shafri et al., "Semi-automatic detection and counting of oil palm trees from high spatial resolution airborne imagery," Int'l J. of R. Sens., pp. 2095-2115, Apr. 2011.

Panu Srestasathiern et al., "Oil Palm Tree Detection with High Resolution Multi-Spectral Satellite Imagery," Int'l J. of R. Sens., pp. 9749-9774, Oct. 2014.

Teja Kattenborn et al., "Automatic Single Palm Tree Detection in Plantations using UAV-based Photogrammetric Point Clouds," ISPRS Tech. Comm. III Symp., pp. 139-144, Sep. 2014.

First Japanese Office Action issued in corresponding Application No. 2017-228695, dated Jan. 29, 2019 (Japanese and English-language) (6 pgs.).

* cited by examiner (a)

(b)

(a)

(b)

METHODS AND SYSTEMS FOR AUTOMATIC OBJECT DETECTION FROM AERIAL IMAGERY

TECHNICAL FIELD

The present disclosure generally relates to methods and systems for detecting objects from aerial imagery, and more particularly, to methods and systems for detecting objects from an aerial image of an area of interest by template matching and artificial intelligence.

BACKGROUND

Automatic object detection is helpful to find and identify target objects in an image. Humans may be able to recognize one or a few target objects in an image with little effort. However, it can be challenging for humans to find and identify a substantial number of target objects in an image. Target objects in images may look different from different viewpoints when displayed in different sizes and scales, or even in different rotated angles. Some computer-implemented methods may detect target objects based on their appearance or features. However, the accuracy of those object detection methods might be not good enough for some applications, such as cash crops or certain agricultural applications.

Object detection from aerial imagery becomes even more challenging when the number of potential target objects in the area of interest increases and the resolution of aerial images is limited. Relying on humans to find and identify target objects becomes infeasible when there are considerable amounts of potential target objects in large-scale areas. Increasing the resolution of aerial images may be helpful in increasing the accuracy of object detection. However, at the same time, performing object recognition and detection on a high-resolution image increases the computing complexity, which would constrain the feasibility and efficiency of certain applications.

Therefore, methods and systems are needed to quickly and precisely detect target objects from aerial imagery of an area of interest. The disclosed methods and systems are directed to overcoming or improving one or more of the problems set forth above and/or other problems in the prior art.

SUMMARY

One aspect of the present disclosure is directed to a non-transitory computer-readable medium storing instructions which, when executed, cause one or more processors to perform operations for detecting objects from aerial imagery. The operations may include obtaining a Digital Surface Model (DSM) image of an area. The operations may further include obtaining a DSM image of one or more target objects. The operations may further include detecting the target object in the area based on the DSM images of the area and the one or more target objects. The operations may further include obtaining the aerial image of the area corresponding to the DSM image of the area. The operations may further include acquiring one or more positions of the detected target objects on the aerial image of the area. The operations may further include acquiring one or more regional aerial images at the one or more positions of the detected target objects. The operations may further include extracting one or more textual features from the one or more regional aerial images as one or more feature vectors. The operations may further include obtaining a plurality of training data, the training data including a plurality of aerial images of the same kind of objects as the target object. The operations may further include training a classifier based on the plurality of training data. The operation may further include classifying the one or more regional aerial images by the trained classifier in accordance with the one or more feature vectors. The operations may further include recognizing the target objects among the one or more regional aerial images based on the classified results. The operations may further include acquiring one or more positions of the recognized target objects. The operations may further include calculating the number of the recognized target objects.

Another aspect of the present disclosure is directed to a method for detecting objects from aerial imagery performed by one or more integrated circuits, one or more field programmable gate arrays, one or more processors or controllers executing instructions that implement the method, or any combination thereof. The method may include obtaining a DSM image of an area. The method may further include obtaining a DSM image of one or more target objects. The method may further include detecting the target object in the area based on the DSM images of the area and the one or more target objects. The method may further include obtaining the aerial image of the area corresponding to the DSM image of the area. The method may further include acquiring one or more positions of the detected target objects on the aerial image of the area. The method may further include acquiring one or more regional aerial images at the one or more positions of the detected target objects. The method may further include extracting one or more textual features from the one or more regional aerial images as one or more feature vectors. The method may further include obtaining a plurality of training data, the training data including a plurality of aerial images of the same kind of objects as the target object. The method may further include training a classifier based on the plurality of training data. The method may further include classifying the one or more regional aerial images by the trained classifier in accordance with the one or more feature vectors. The method may further include recognizing the target objects among the one or more regional aerial images based on the classified results. The method may further include acquiring one or more positions of the recognized target objects. The method may further include calculating the number of the recognized target objects.

Yet another aspect of the present disclosure is directed to a system for detecting objects from aerial imagery. The system for detecting objects from aerial imagery may include an aerial image unit, a target image unit, and a detection unit. The aerial image unit may be configured to obtain a DSM image of an area. The target image unit may be configured to obtain a DSM image of one or more target objects. The detection unit may be configured to detect the target object in the area based on the DSM images of the area and the one or more target objects.

The system for detecting object from aerial imagery may further include a positioning unit, a regional aerial-image unit, an extraction unit, and a classification and recognition unit. The aerial image unit may be further configured to obtain the aerial image of the area corresponding to the DSM image of the area. The positioning unit may be configured to acquire one or more positions of the detected target objects on the aerial image of the area. The regional aerial-image acquisition unit may be configured to acquire one or more regional aerial images at the one or more positions of the detected target objects. The extraction unit may be configured to extract one or more textual features from the one or more regional aerial images as one or more feature vectors. The classification and recognition unit may be configured to obtain a plurality of training data, the training data including a plurality of aerial images of the same kind of objects as the target object. The classification and recognition unit may be further configured to train a classifier based on the plurality of training data. The classification and recognition unit may be further configured to classify the one or more regional aerial images by the trained classifier in accordance with the one or more feature vectors. The classification and recognition unit may be further configured to recognize the target objects among the one or more regional aerial images based on the classified results. The classification and recognition unit may be further configured to acquire one or more positions of the recognized target objects. The classification and recognition unit may be further configured to calculate the number of the recognized target objects.

BRIEF DESCRIPTION OF THE DRAWINGS

This patent or application contains at least one drawing executed in color. Copies of this patent or patent application publication with color drawings(s) will be provided by the Office upon request and payment of the necessary fee.

DETAILED DESCRIPTION

This disclosure is generally directed to methods and systems for detecting objects from aerial imagery. It is contemplated that a target object may be a plant, a tree, an oil palm tree, an object, a building, a facility, a land, a geomorphological feature, or any combination thereof. In general, target objects to be detected may include anything, such as objects, buildings, facilities, plants, trees, animals, and even humans. Target objects may have several features in color, shape, and/or appearance. These features of target objects may be utilized to detect target objects in an image of an area of interest.

Figure 1:
FIG. 1 is an illustration (in color) of an exemplary aerial image of an area for automatic object detection, according to a disclosed embodiment.

FIG. 1 is an illustration of an exemplary aerial image of an area for automatic object detection, according to a disclosed embodiment. The oil palm trees, for example, are the exemplary target objects to be detected in the aerial image of the area. These oil palm trees have certain heights from the ground. In some embodiments, the disclosed methods and systems may include detecting target objects based on height information of target objects in the aerial image of the area. For example, a DSM of an area may include the earth's surface and all objects, and the height information associated with the earth surface and all objects. It is contemplated that the disclosed methods and systems may include detecting target objects through the height information contained in a DSM of an area of interest. In some embodiments, the disclosed methods and systems may include detecting target objects in various models and/or images of an area containing height information, such as Digital Elevation Model (DEM) of an area.

In some embodiments, the disclosed methods and systems may include obtaining DSMs, DEMs, and/or aerial images of an area by using one or more Light Detection And Ranging (LiDAR) sensors, real-time DSM sensors, sensors for post-producing DSM, calculations from a plurality of aerial images of the area, or any combination thereof. In some embodiments, the disclosed methods and systems may include collecting the DSM, DEMs, and/or aerial images of an area by using one of the aforementioned sensors and/or a camera by an Unmanned Aerial Vehicle (UAV) 100 (shown in FIG. 13), a drone, an aircraft, a helicopter, a balloon, or a satellite. In some embodiments, the disclosed methods and systems may further include receiving relevant data of DSMs, DEMs, and/or aerial images of an area from UAV 100, a drone, an aircraft, a helicopter, a balloon, or a satellite through a wireless connection, such as Bluetooth, Wi-Fi, cellular (e.g., GPRS, WCDMA, HSPA, LTE, or later generations of cellular communication systems), and satellite connection, or a wired connection, such as a USB line or a Lighting line.

In some embodiments, the disclosed methods and systems may include obtaining the DSMs, DEMs, and/or aerial images of an area for object detection from a plurality of DSMs, DEMs, and/or aerial images of parts of the area. For example, the disclosed methods and systems may include combining or stitching a plurality of aerial images of parts of the area to obtain the aerial images of the area in FIG. 1 for object detection. The disclosed methods and systems may include determining the appropriate mathematical model relating pixel coordinates in one image to pixel coordinates in another for image alignment. The disclosed methods and systems may further include estimating correct alignments relating various pairs of aerial images by combining direct pixel-to-pixel comparisons with gradient descent. The disclosed methods and systems may further include identifying and matching distinctive features in aerial images of parts of the area to establish correspondences between pairs of aerial images. The disclosed methods and systems may further include deciding a final compositing surface onto which to warp or projectively transform and place all of the aligned aerial images. The disclosed methods and systems may further include seamlessly blending the overlapping aerial images, even in the presence of parallax, lens distortion, scene motion, and exposure differences.

Figure 2:
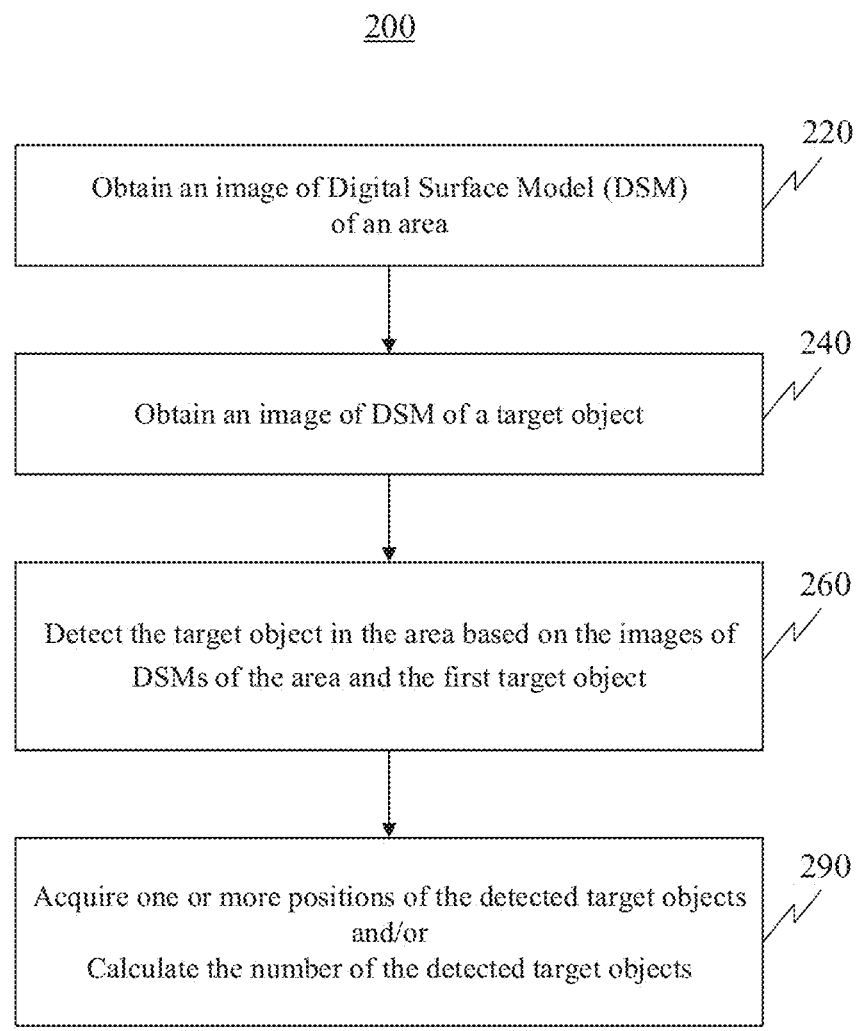
FIG. 2 is a flow chart illustrating an exemplary method for automatic object detection from aerial imagery, according to a disclosed embodiment.

FIG. 2 is a flow chart illustrating an exemplary method 200 for automatic object detection from aerial imagery, according to a disclosed embodiment. One aspect of the present disclosure is directed to a non-transitory computer-readable medium storing instructions which, when executed, cause one or more processors to perform the exemplary method 200 in FIG. 2 for detecting objects from aerial imagery. The computer-readable medium may include volatile or non-volatile, magnetic, semiconductor, tape, optical, removable, non-removable, or other types of computer-readable medium or computer-readable storage devices. For example, the computer-readable medium may be the storage unit or the memory module having the computer instructions stored thereon, as disclosed. In some embodiments, the computer-readable medium may be a disc or a flash drive having the computer instructions stored thereon. In some embodiments, the computer-readable medium may be a cloud or a remote storage having the computer instructions stored thereon, which instructions may be downloaded to another device for the execution.

Method 200 may include the steps of obtaining a DSM image of an area (step 220), obtaining a DSM image of a target object (step 240), and detecting the target object in the area based on the DSM images of the area and the target object in steps 220 and 240 (step 260). It should be noted that a DSM of an area contains height information of the area. A DSM image of the area may be obtained by using the height information of the area as the grayscale values of the grayscale image of the area, and vice versa. Accordingly, a "DSM" and a "DSM image" may be alternatively used if applicable throughout the whole present disclosure.

Step 220 may include obtaining a DSM image of an area of interest. For example, obtaining a DSM image of an area of step 220 may include accessing a DSM image of an area of interest from a computer-readable medium or computer-readable storage device. For another example, obtaining a DSM image of an area of step 220 may include receiving a DSM image of an area of interest from an external input, such as image input 120 (which will be described in the disclosed systems). Image input 120 may be communicatively connected to, for example, UAV 100, a drone, an aircraft, a helicopter, a balloon, or a satellite. In other words, obtaining a DSM image of an area of step 220 may include receiving the DSM image of an area of interest from UAV 100, a drone, an aircraft, a helicopter, a balloon, or a satellite. In some embodiments, obtaining a DSM image of an area of step 220 may include obtaining a plurality of DSM images of parts of the area, and combining or stitching the plurality of DSM images of parts of the area to obtain the DSM image of the area of interest. For example, obtaining a DSM image of an area of step 220 may include obtaining a plurality of DSM images of parts of the area, and identifying and matching distinctive features in the plurality of DSM images of parts of the area to establish correspondences between pairs of DSM images. Obtaining a DSM image of an area of step 220 may further include blending the plurality of DSM images of parts of the area based on the established correspondences between the pairs of DSM images to obtain the DSM image of the area of interest.

Figure 3:
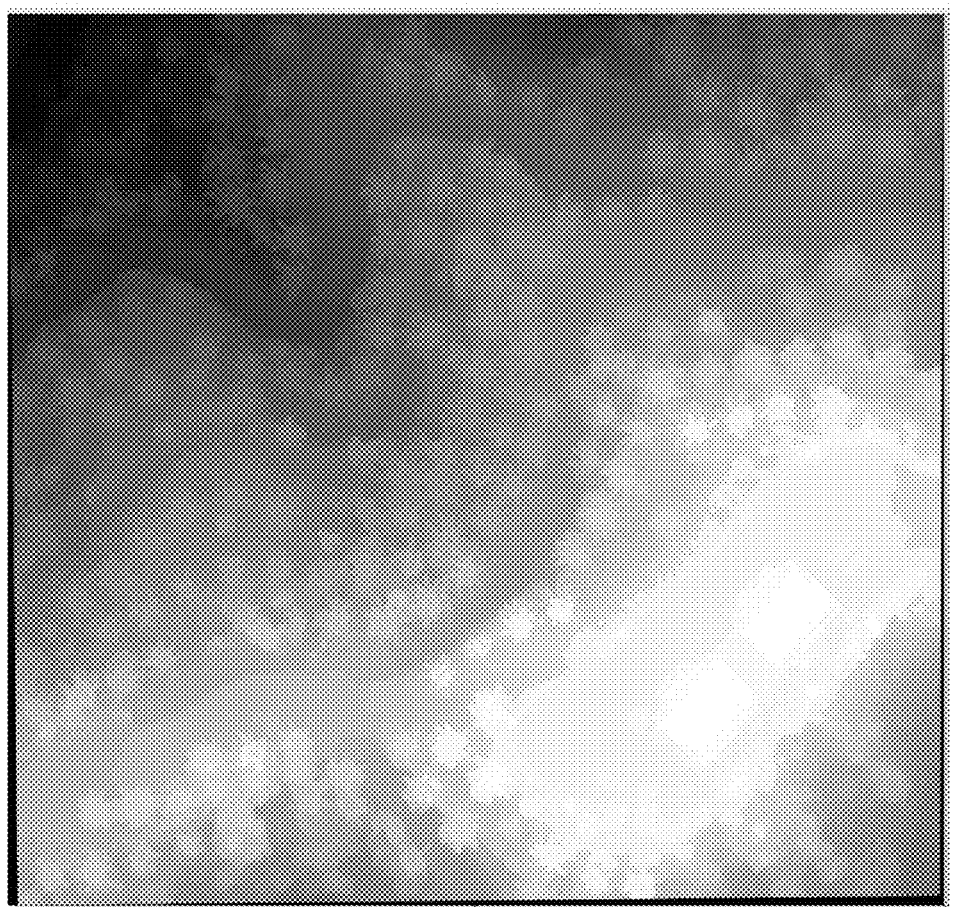
FIG. 3 is an illustration of an exemplary DSM image of the area, corresponding to the exemplary aerial image of the area in FIG. 1, for automatic object detection, according to a disclosed embodiment.

In some embodiments, obtaining a DSM image of an area of step 220 may include obtaining a plurality of aerial images of an area, combining or stitching these aerial images of parts of the area to obtain an aerial image of the area, and transferring the stitched aerial image of the area into a DSM image of the area. For example, obtaining a DSM image of an area of step 220 may include receiving a plurality of aerial images of parts of an area, and stitching the plurality of aerial images of parts of the area to obtain the aerial image of the area as shown in FIG. 1. Those aerial images of parts of the area may be associated with a plurality of DSMs of parts of the area. In other words, the plurality of aerial images of parts of the area may be corresponded to a plurality of DSMs of parts of the area. Step 220 may include obtaining a DSM image of the area in FIG. 3 corresponding to the stitched aerial images of the area in FIG. 1 based on the correspondence between the aerial images and the DSMs of the parts of the area. FIG. 3 is an illustration of an exemplary DSM image of the area, corresponding to the exemplary aerial image of the area in FIG. 1, for automatic object detection, according to a disclosed embodiment.

In some embodiments, obtaining the DSM image of the area of step 220 may include collecting DSMs and/or aerial images of the area or parts of the area by using one or more LiDAR sensors, real-time DSM sensors, sensors for post-producing DSM, calculations from a plurality of aerial images of the area, or any combination thereof. In some embodiments, obtaining the DSM image of the area of step 220 may include collecting DSMs and/or aerial images of an area or parts of the area by using one of the aforementioned sensors and/or a camera through UAV 100, a drone, an aircraft, a helicopter, a balloon, or a satellite. In some embodiments, obtaining the DSM image of the area of step 220 may further include receiving collected data of DSMs and/or aerial images of the area from UAV 100, a drone, an aircraft, a helicopter, a balloon, or a satellite through a wireless connection, such as Bluetooth, Wi-Fi, cellular (e.g., GPRS, WCDMA, HSPA, LTE, or later generations of cellular communication systems), and satellite connection, or a wired connection, such as a USB line or a Lighting line.

In some embodiments, obtaining a DSM image of an area of step 220 may further include obtaining a color aerial image of the area corresponding to the DSM image of the area, obtaining a color aerial image of a target object, identifying one or more subareas of the area as one or more target subareas based on the color aerial image of the area and the color of the target object.

For example, obtaining a DSM image of an area of step 220 may further include obtaining the RGB aerial image of the area in FIG. 1 corresponding to the DSM image of the area of interest in FIG. 3. In addition, obtaining a DSM image of an area of step 220 may further include obtaining an RGB aerial image of an oil palm tree, the target object. Moreover, obtaining a DSM image of an area of step 220 may further include identifying the color green as a specific primary color of the oil palm tree. Furthermore, obtaining a DSM image of an area of step 220 may further include identifying those pixels of the aerial image of the area as possible pixels of oil palm trees when their individual G values are larger than their both individual R and B values. For example, the following conditional operations may be used to check whether a pixel is identified as possible pixels of oil palm trees: If (Pixel.G>Pixel.R && Pixel.G>Pixel.B) Get Pixel, where Pixel.R, Pixel.G, and Pixel.B stands for the individual R, G, and B levels of the pixel. Furthermore, obtaining a DSM image of an area of step 220 may further include identifying a certain amount of adjacent possible pixels of the oil palm trees as a target subarea.

In some embodiments, obtaining a DSM image of an area of step 220 may further include identifying a specific primary color of the target object. For example, identifying a specific primary color of the target object of step 220 may include comparing individual R, G, and B levels within pixels of the aerial image of the target object, and determining representative primary colors of these pixels. In addition, identifying a specific primary color of the target object of step 220 may further include calculating the numbers of representative primary colors of these pixels, and identifying the representative primary color of the maximum number of pixels as the specific primary color of the target object. For example, identifying a specific primary color of the target object of step 220 may include identifying the color green as the specific primary color of the oil palm tree when the color green is the representative primary color with the maximum number of the pixels of the aerial image of the oil palm tree.

In some embodiments, obtaining a DSM image of an area of step 220 may further include enhancing the contrast of the images of the one or more target subareas on the DSM image of the area. For example, enhancing the contrast of the target subareas of step 220 may include enhancing the contrast of the target subareas of the DSM image of the area corresponding to the identified target subareas of the aerial image of the area by histogram equalization. By using histogram equalization, for example, enhancing the contrast of step 220 may include calculating the probability mass function of the pixels of the target subareas, calculating cumulative distributive function (CDF) values according to gray levels, multiplying the CDF values with the (Gray levels—1), and mapping the new gray level values into the pixels of the target subareas. Enhancing the contrast of step 220 may include enhancing the contrast by other algorithms, such as global stretching, anisotropic diffusion, non-linear pyramidal techniques, multi-scale morphological techniques, multi-resolution splines, mountain clustering, retinex theory, wavelet transformations, curvelet transformations, k-sigma clipping, fuzzy logic, genetic algorithms, or greedy algorithms.

Figure 4:
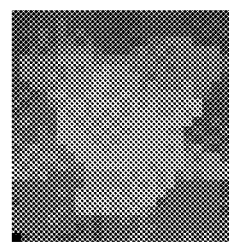
FIG. 4 is an illustration of two exemplary DSM images of an exemplary kind of target objects for automatic object detection, according to a disclosed embodiment.
Figure 4:
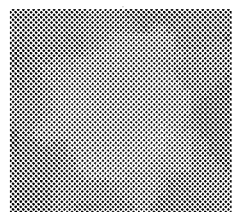

Step 240 may include obtaining a DSM image of a target object. FIG. 4 is an illustration of two exemplary DSM images of an exemplary kind of target objects for automatic object detection, according to a disclosed embodiment. For example, obtaining a DSM image of a target object of step 240 may include accessing the DSM image of the oil palm tree in FIG. 4(*a*) from a computer-readable medium or computer-readable storage device. For another example, obtaining a DSM image of a target object of step 240 may include receiving the DSM image of the oil palm tree in FIG. 4(*a*) from an external input, such as image input 120 (will be described in the disclosed systems). For another example, obtaining a DSM image of a target object of step 240 may include receiving a selection signal from an internal input, such as image input 120. The selection signal may include identifying a part of the DSM image of the area in step 220 as a DSM image of a target object. For example, the selection signal may include identifying a region, surrounding a DSM image of an oil palm tree, on the DSM image of the area as the target object while a user uses a mouse cursor, his/her finger, or a pen to select the region on a display screen.

In some embodiments, obtaining a DSM image of a target object of step 240 may include accessing or receiving a plurality of DSM images of target objects, and selecting one of them as a DSM image of a target object. Selecting the DSM image of the target object of step 240 may include selecting the DSM image of the target object based on the shape of the target object. For example, selecting the DSM image of the target object of step 240 may include selecting the DSM image of the target object whose shape may be similar to most of the same kind of target objects. In some embodiments, selecting the DSM image of the target object of step 240 may include selecting the DSM image of a target object based on the contrast of the DSM image of the target object. For example, selecting the DSM image of the target object of step 240 may include selecting the DSM image of the target object whose contrast may be better than others. In some embodiments, obtaining the DSM image of the target object of step 240 may include obtaining more than one DSM image of the target object. For example, obtaining the DSM image of the target object of step 240 may include obtaining two DSM images of the target objects based on the shape of the target object and the contrast of the DSM image of the target object respectively.

In some embodiments, obtaining the DSM image of the target object of step 240 may include collecting one or more DSMs and/or aerial images of target objects by using one or more LiDAR sensors, real-time DSM sensors, sensors for post-producing DSM, calculations from a plurality of aerial images of the area, or any combination thereof. In some embodiments, obtaining the DSM image of the target object of step 240 may further include collecting one or more DSMs and/or aerial images of target objects using one of the aforementioned sensors and/or a camera by UAV 100, a drone, an aircraft, a helicopter, a balloon, or a satellite. In some embodiments, obtaining the DSM image of the target object of step 240 may include receiving DSMs and/or aerial images of the target objects from UAV 100, a drone, an aircraft, a helicopter, a balloon, or a satellite through a wireless connection, such as Bluetooth, Wi-Fi, cellular (e.g., GPRS, WCDMA, HSPA, LTE, or later generations of cellular communication systems), and satellite connection, or a wired connection, such as a USB line or a Lighting line.

In some embodiments, obtaining the DSM image of the target object of step 240 may include obtaining one or more aerial images of target objects corresponding to one or more DSM images of target objects, and selecting one or more DSM images of target objects based on the shape of the target object and/or the contrast of the aerial image of the target object.

Step 260 may include detecting the target object in the area based on the DSM images of the area and the target object in steps 220 and 240. In some embodiments, detecting the target object of step 260 may include calculating match rates between the DSM image of the target object and a plurality of DSM sub-images of the area, and determining one or more DSM sub-images of the area as the target objects based on the match rates. For example, detecting the target object of step 260 may include calculating match rates between the DSM image of an oil palm tree in FIG. 4(*a*) and a plurality of DSM sub-images of the area from the DSM image of the area in FIG. 3. The plurality of DSM sub-images of the area may have the same or similar size as the DSM image of the oil palm tree. For example, the sizes of the plurality of DSM sub-images of the area may be 300× 300 pixels while the DSM image of the oil palm tree in FIG. 4(*a*) may be 300×300 pixels or a similar size. For example, the plurality of DSM sub-images of the area may include sub-images of 300×300 pixels on every 1, 2, 5, or 10 pixels of the DSM image of the area. In other words, detecting the target object of step 260 may include comparing the template DSM image of the oil palm tree (T) against the DSM image of the area (I) by sliding through its each 1, 2, 5, or 10 pixels. For example, for each position (x, y) of the sliding on the DSM image of the area, the match rate R may be calculated as:

$$R(x, y) = \frac{\sum_{x'y'} (T'(x', y') - I'(x + x', y + y'))}{\sqrt{\sum_{x'y'} T'(x', y')^2 \cdot \sum_{x'y'} I'(x + x', y + y')^2}}$$

where x' and y' refer to pixel positions within the template DSM image of the oil palm tree (T') and the DSM sub-images of the area (I').

Figure 5:
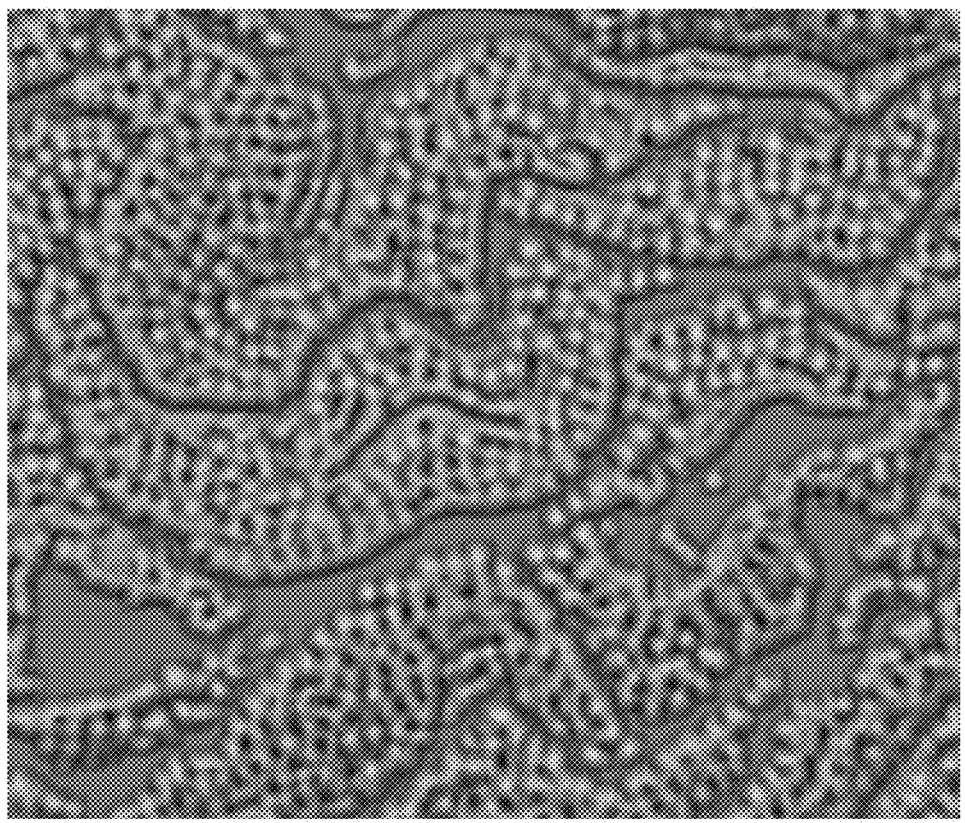
FIG. 5 is an illustration of an exemplary image of matching rates from exemplary calculations of match rates between the exemplary DSM image of the area in FIG. 3 and the exemplary template image in FIG. 4 for automatic object detection, according to a disclosed embodiment.

FIG. 5 is an illustration of an exemplary image of matching rates from exemplary calculations of match rates between the exemplary DSM image of the area in FIG. 3 and the exemplary template image in FIG. 4 for automatic object detection, according to a disclosed embodiment. In FIG. 5, the brighter a position is, the higher the possibility the position is a target object. For example, the bright points on the image of match rates in FIG. 5 may be positions of oil palm trees in the area of interest.

In some embodiments, calculating match rates of step 260 may include calculating match rates according to conventional template match methods, such as a squared difference method, a normalized squared difference method, a cross-correlation method, a normalized cross-correlation method, a correlation coefficient method, a normalized correlation coefficient method, or any combination thereof.

In some embodiments, determining DSM sub-images of the area as the target objects of step 260 may include determining one or more DSM sub-images of the area as the oil palm trees when their match rates Rs with the template image of the target object are higher than a match threshold, such as 80%, 70%, or 60% of the self-match rate of the template DSM image of the oil palm tree (T).

In some embodiments, detecting the target object of step 260 may include reducing the resolutions of the DSM images of the area and the target object in steps 220 and 240, and detecting the target object in the area based on the resolution-reduced DSM images of the area and the target object. For example, detecting the target object of step 260 may include reducing the resolutions of the DSM images of the area in FIG. 3 and the oil palm tree in FIG. 4(*a*) to 0.1 times the original resolutions. Detecting the target object of step 260 may further include calculating match rates between the resolution-reduced DSM image of the oil palm tree and a plurality of resolution-reduced DSM sub-images of the area, and determining one or more DSM sub-images of the area as the target object based on the match rates.

In some embodiments, detecting the target object of step 260 may include detecting the target object in the area based on the image of DSMs of the area in step 220 and more than one image of target objects in step 240. For example, detecting the target object of step 260 may include calculating match rates between the two DSM images of the oil palm trees in FIGS. 4(*a*) and 4(*b*) and a plurality of DSM sub-images of the area respectively, and determining one or more DSM sub-images of the area as the oil palm trees based on the match rates from the two DSM images of the oil palm trees. For example, detecting the target object of step 260 may include calculating match rates between a DSM image of an oil palm tree selected based on the shape of the target object in step 240 and a plurality of DSM sub-images of the area. Detecting the target object of step 260 may also include calculating match rates between another DSM image of an oil palm tree selected based on the contrast of the image in step 240 and a plurality of DSM sub-images of the area. Detecting the target object of step 260 may further include determining one or more DSM sub-images of the area as the oil palm tree when their match rates, from the template DSM image of an oil palm tree selected based on either the shape of the target object or the contrast of the image, are higher than a match threshold. For another example, determining the oil palm trees of step 260 may include determining one or more DSM sub-images of the area as the oil palm trees when both their match rates, from the template DSM images of an oil palm tree selected based on the shape of the oil palm tree and the contrast of the image of the oil palm tree, are higher than a match threshold.

In some embodiments, determining DSM sub-images of the area as the target objects of step 260 may include determining the target objects based on one or both of the following two criteria. The match rates of the one or more DSM sub-images of the area are the maximum within a distance ($D_1$) on the aerial image of the area. The heights of the one or more DSM sub-images of the area are higher than the height of the lowest position within another distance ($D_2$) by a height threshold ($H_1$). For example, determining the oil palm trees of step 260 may include determining one or more DSM sub-images of the area as the oil palm tree when their match rates are higher than the others within 2 meters (i.e. $D_1$=2 meters), an exemplary radius of an aerial image of an oil palm tree. For another example, determining the oil palm trees of step 260 may include determining one or more DSM sub-images of the area as the oil palm tree when their heights are higher than the height of the lowest position within 3 meters (i.e. $D_2$=3 meters), an exemplary radius of an individual area where an oil palm tree and the land may both exist, by an exemplary height threshold of 2.5 meters (i.e. $H_1$=2.5 meters). An oil palm tree higher than 2.5 meters from the ground may be detected according to the aforementioned $D_1$, $D_2$, and $H_1$ parameters. These factors may be adjustable for various target objects according to their heights and distribution.

In some embodiments, step 260 may include detecting the target object in the area based on the enhanced DSM image of the area in step 220 and the DSM image of the target object. For example, detecting the target object of step 260 may include detecting the oil palm tree in the area based on one or two DSM images of the oil palm trees in FIG. 4 and the contrast-enhanced DSM image of the area, whose target subareas may have been identified and enhanced the contrast in step 220.

Figure 6:
FIG. 6 is an illustration (in color) of the exemplary aerial image of the area marked with the positions of the detected exemplary target objects in accordance with the exemplary method for automatic object detection in FIG. 2, according to a disclosed embodiment.

In some embodiments, method 200 may further include acquiring one or more positions of the target objects detected in step 260. For example, acquiring positions of the target objects may include acquiring the positions of the oil palm trees detected on the DSM image of the area in FIG. 3. For another example, acquiring positions of the target objects of step 290 may include acquiring the positions of the oil palm trees detected on the aerial images of the area based on the correspondence between the DSM image of the area and the aerial image of the area. FIG. 6 is an illustration of the exemplary aerial image of the area marked with the positions of the exemplary target objects detected in accordance with the exemplary method for automatic object detection in FIG. 2, according to a disclosed embodiment. In FIG. 6, the detected oil palm trees are marked by red circles in the aerial image of the area.

In some embodiments, step 290 may further include displaying the positions of the detected target objects on the aerial image of the area or a map. For example, displaying the detected target objects of step 290 may include displaying the positions of the one or more detected oil palm trees on the aerial image of the area as the red circles shown in FIG. 6. For another example, displaying the detected target objects of step 290 may include displaying the positions of the one or more detected oil palm trees on a map of the area based on the association or correspondence between the positions on the DSM image of the area and the map of the area (not shown). For example, a position on the DSM image of the area may be associated with a set of longitude, latitude, and elevation. Step 290 may include obtaining the detected oil palm trees' sets of longitudes, latitudes, and elevations, and displaying the detected oil palm trees on a map based on the sets of longitudes, latitudes, and/or elevations. For example, displaying the detected oil palm trees of step 290 may include displaying the detected oil palm trees on a geographic information system (GIS) map based on the sets of longitudes and latitudes. For another example, displaying the detected oil palm trees of step 290 may include displaying the detected oil palm trees on a map based on the sets of longitudes, latitudes, and elevations, for example a 3D GIS map.

In some embodiments, step 290 may further include calculating the number of the detected target objects. For example, calculating the detected target objects of step 290 may include calculating the detected oil palm trees shown in the FIG. 6.

Figure 7:
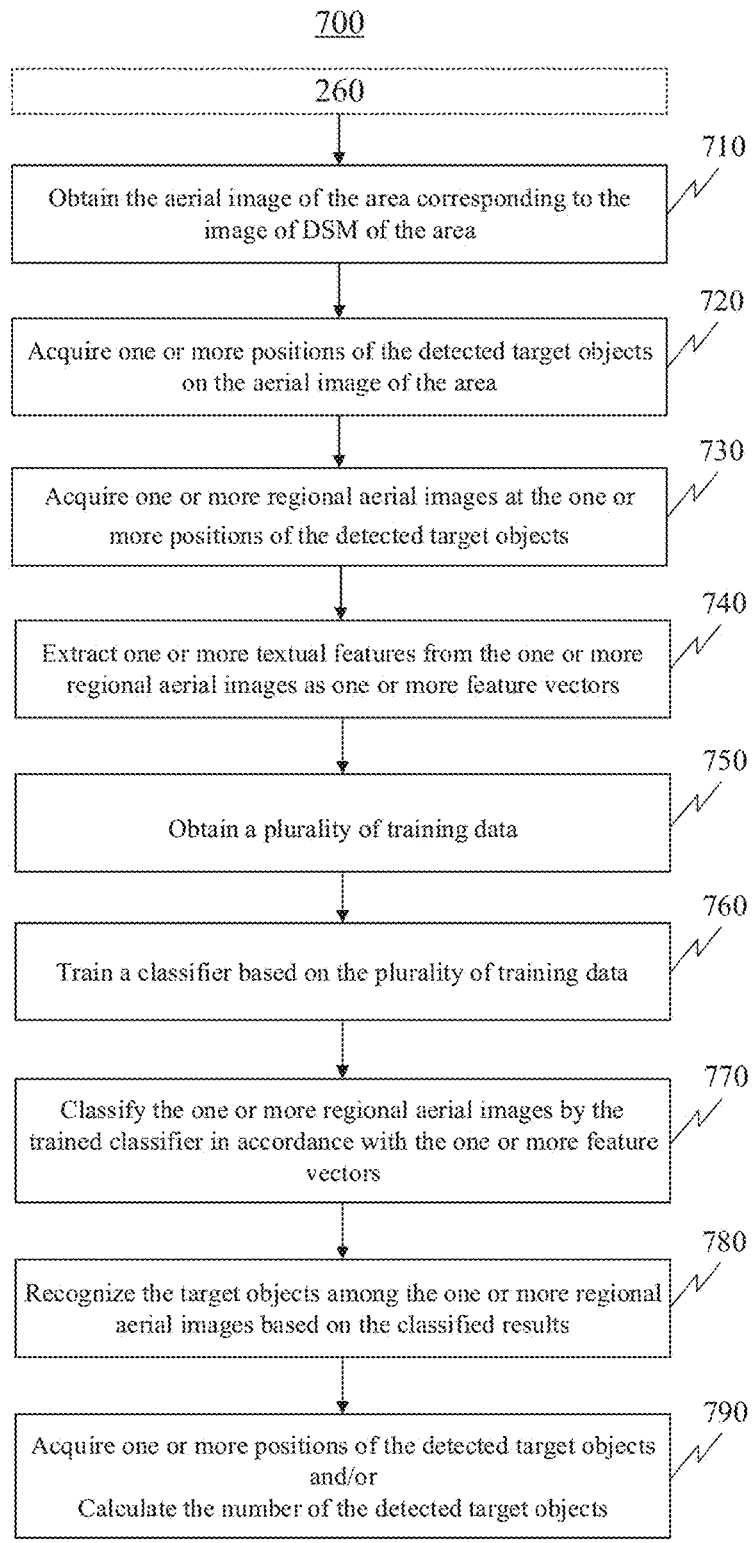
FIG. 7 is a flow chart illustrating another exemplary method for automatic object detection from aerial imagery, according to a disclosed embodiment.

FIG. 7 is a flow chart illustrating another exemplary method 700 for automatic object detection from aerial imagery, according to a disclosed embodiment. Method 700 may include steps 220, 240, and 260, and may further include obtaining the aerial image of the area corresponding to the DSM image of the area (step 710), acquiring one or more positions of the detected target objects on the aerial image of the area (step 720), acquiring one or more regional aerial images at the one or more positions of the detected target objects (step 730), extracting one or more textual features from the one or more regional aerial images as one or more feature vectors (step 740), obtaining a plurality of training data (step 750), training a classifier based on the plurality of training data (step 760), classifying the one or more regional aerial images by the trained classifier in accordance with the one or more feature vectors (step 770), and recognizing the target objects among the one or more regional aerial images based on the classified results (step 780). The training data may include a plurality of aerial images of the same kind of objects as the target objects.

Step 710 may include obtaining the aerial image of the area corresponding to the DSM image of the area in step 220. For example, step 710 may include obtaining the aerial image of the area of interest in FIG. 1 corresponding to the DSM image of the area of interest in FIG. 3. For example, obtaining the aerial image of the area of step 710 may include accessing the aerial image of the area of interest from a computer-readable medium or computer-readable storage device. For another example, obtaining the aerial image of the area of step 710 may include receiving the DSM image of the area from an external input, such as image input 120 (will be described in the disclosed systems). In some embodiments, obtaining the aerial image of the area of step 710 may include obtaining a plurality of aerial images of parts of the area, and stitching the plurality of aerial images of parts of the area to obtain the aerial image of the area. For example, obtaining the aerial image of the area of step 710 may include obtaining a plurality of aerial images of parts of the area in FIG. 1, and stitching the aerial images of parts of the area to obtain the aerial image of the area of interest.

In some embodiments, obtaining the aerial image of the area of step 710 may include obtaining the aerial image of the area in various color spaces. For example, obtaining the aerial image of the area of step 710 may include obtaining the aerial image of the area in color spaces including at least one of RGB, grayscale, HSI, L*a*b, multi-spectral space, or any combination thereof.

In some embodiments, obtaining the aerial image of the area of step 710 may include collecting aerial images of the area or parts of the area by using one or more LiDAR sensors, real-time DSM sensors, sensors for post-producing DSM, calculations from a plurality of aerial images of the area, or any combination thereof. In some embodiments, obtaining the aerial image of the area of step 710 may include collecting aerial images of an area or parts of the area using one of the aforementioned sensors and/or a camera by UAV 100, a drone, an aircraft, a helicopter, a balloon, or a satellite. In some embodiments, obtaining the aerial image of the area of step 710 may further include receiving collected data of aerial images of the area from UAV 100, a drone, an aircraft, a helicopter, a balloon, or a satellite through a wireless connection, such as Bluetooth, Wi-Fi, cellular (e.g., GPRS, WCDMA, HSPA, LTE, or later generations of cellular communication systems), and satellite connection, or a wired connection, such as a USB line or a Lighting line.

Step 720 may include acquiring one or more positions of the detected target objects in step 260 on the aerial image of the area. For example, acquiring the positions of the detected target object of step 720 may include acquiring the positions of the detected oil palm trees on the DSM image of the area in FIG. 3, and acquiring the positions of the detected oil palm trees on the aerial images of the area in FIG. 1 based on the correspondence between the DSM image of the area and the aerial image of the area. In other words, acquiring the positions of the detected target object of step 720 may include acquiring the positions of the red circles, the detected oil palm trees, in FIG. 6.

Figure 8:
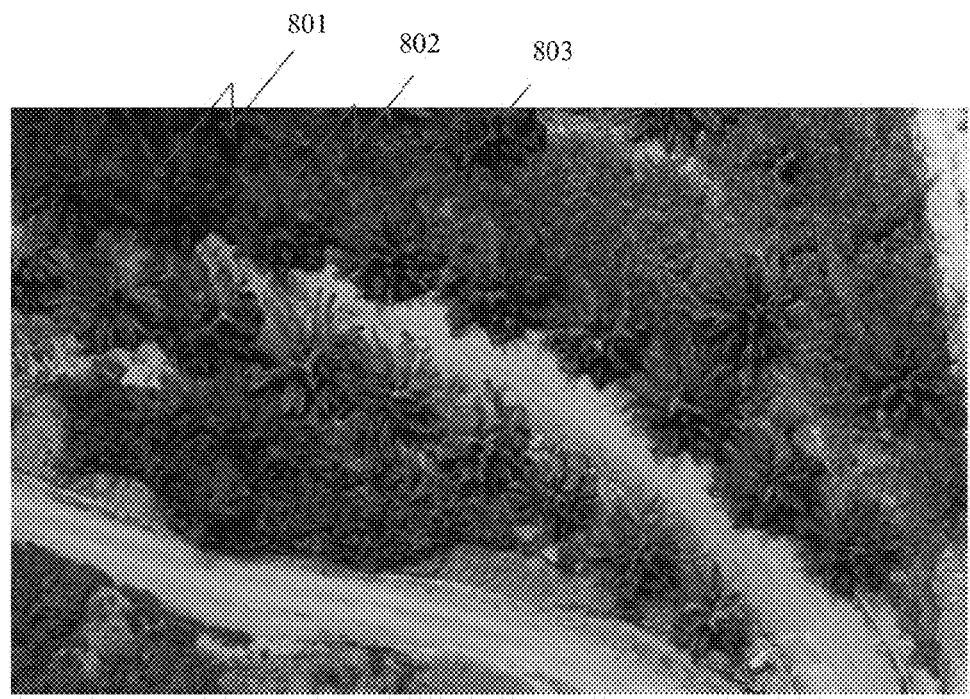
FIG. 8 is an illustration (in color) of a partial enlarged view of the exemplary aerial image of the area marked with the positions of the detected exemplary target objects in accordance with the exemplary method for automatic object detection in FIG. 2, according to a disclosed embodiment.

Step 730 may include acquiring one or more regional aerial images at the one or more positions of the detected target objects. FIG. 8 is an illustration of a partial enlarged view of the exemplary aerial image of the area marked with the positions of the detected exemplary target objects in accordance with the exemplary method for automatic object detection in FIG. 2, according to a disclosed embodiment. For example, acquiring the regional aerial images of step 730 may include acquiring 300×300 regional aerial images at detected oil palm trees 801, 802, 803 in FIG. 8 from the aerial image of the aerial in step 710 based on the position acquired in step 720. For example, acquiring the regional aerial images of step 730 may include acquiring the 300×300 regional aerial images of detected oil palm trees by referring to detected positions in step 720 as the centers of the 300×300 regional aerial images. For another example, acquiring the regional aerial images of step 730 may include acquiring circular regional aerial images at detected oil palm trees by referring to detected positions in step 720 as the centers of the circles. The radius of the circular aerial image of the detected oil palm tree may include, for example, 150 pixels. The shape of the regional aerial images of the detected target objects may include other shapes such as rectangle, triangle, or other shapes similar to the shape of the target objects.

In some embodiments, acquiring the regional aerial images of step 730 may include creating one or more coordinates by using the positions of the detected target objects as origins, and acquiring one or more 300×300 regional aerial images around these origins. These coordinates may be used to refer to the acquired regional aerial images.

In some embodiments, acquiring the regional aerial images of step 730 may include acquiring one or more regional aerial images at the one or more positions of the detected target objects in various color spaces. For example, acquiring the regional aerial images of step 730 may include acquiring one or more 300×300 regional aerial images of the detected oil palm trees in color spaces such as RGB, grayscale, HSI, L*a*b, multi-spectral space, or any combination thereof. For example, acquiring the regional aerial images of step 730 may include acquiring these regional aerial images of the detected oil palm trees in the aforementioned color spaces from the aerial image of the area in the aforementioned color spaces in step 710. In some embodiments, acquiring the regional aerial images of step 730 may include acquiring one or more regional aerial images of the detected target objects in a color space, and transferring the one or more regional aerial images of the detected target objects in the color space to their counterparts in another color space. For example, acquiring the regional aerial images of step 730 may include acquiring one or more RGB regional aerial images of the detected oil palm trees, and transferring them to grayscale counterparts. For another example, acquiring the regional aerial images of step 730 may include acquiring one or more RGB regional aerial images of the detected oil palm trees, and transferring them to their counterparts in HSI.

Step 740 may include extracting one or more textual features from the one or more regional aerial images as one or more feature vectors of the detected target objects in step 260. For example, extracting the textual features of step 740 may include extracting the one or more textual features based on Gabor filter, Gray-Level Co-occurrence Matrix (GLCM), Local Binary Pattern (LBP), Histograms of Oriented Gradients (HOG), first-order feature description, second-order feature description, or any combination thereof. Extracting feature of step 740 may include extracting informative and non-redundant features of the regional aerial images by the aforementioned methods to facilitate subsequent classifications in step 770.

In some embodiments, extracting one or more textual features of step 740 may include extracting the one or more texture features from at least one of the one or more regional aerial images in one color space, and/or the one or more regional aerial images in another color space. For example, extracting one or more textual features of step 740 may include extracting the one or more textual features from the one or more regional aerial images of the detected oil palm trees in grayscale based on Multi-block Local Binary Patterns (MB-LBP). For another example, extracting one or more textual features of step 740 may include extracting the one or more textual features from the one or more regional aerial images of the detected oil palm trees in RGB based on Gabor filter. For another example, extracting one or more textual features of step 740 may include extracting the one or more textual features from the one or more regional aerial images of the detected oil palm trees in both grayscale and RGB based on Multi-block Local Binary Patterns (MB-LBP). For another example, extracting one or more textual features of step 740 may include extracting the one or more textual features from the one or more regional aerial images of the detected oil palm trees in grayscale based on GLCM, and extracting the one or more textual features from the one or more regional aerial images of the detected oil palm trees in L*a*b based on HOG.

Figure 9:
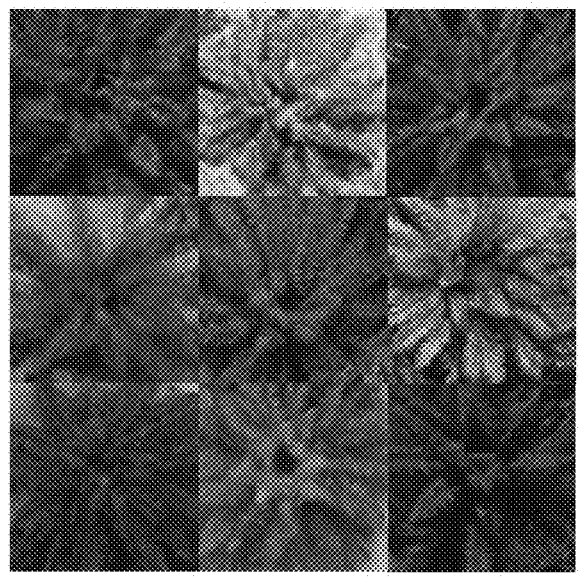
FIG. 9 is an illustration (in color) of a plurality of exemplary training data that may be utilized to train an exemplary classifier for automatic object detection, according to a disclosed embodiment.
Figure 9:
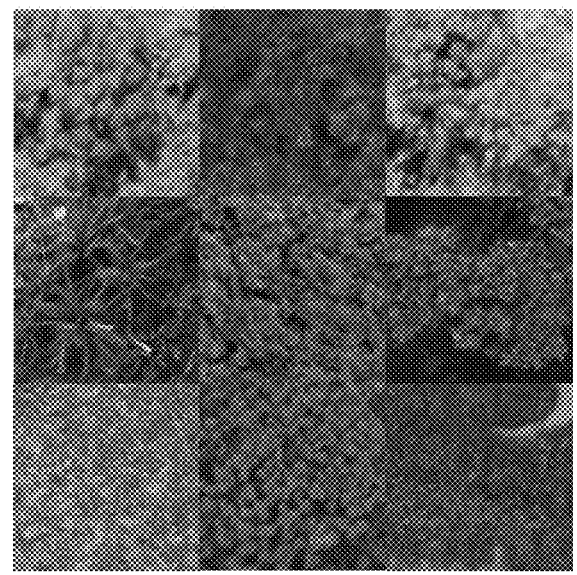

Step 750 may include obtaining a plurality of training data. The training data may include a plurality of aerial images of the same kind of objects as the target objects. FIG. 9 is an illustration of a plurality of exemplary training data that may be utilized to train an exemplary classifier for automatic object detection, according to a disclosed embodiment. For example, step 750 may include obtaining a plurality of aerial images of oil palm trees, shown in FIG. 9(a), as being the training data. In some embodiments, step 750 may further include obtaining a plurality of aerial images of non-target objects, shown in FIG. 9(b), as being a part of the training data. For example, obtaining the training data of step 750 may include accessing the training data from a computer-readable medium or computer-readable storage device. For another example, obtaining the training data of step 750 may include receiving the training data from an external input, such as image input 120 (will be described in the disclosed systems).

Step 760 may include training a classifier based on the plurality of training data in step 750. A classifier is a function that uses pattern matching to determine a closest match. It can be tuned according to training data. Training data may include observations or patterns. For example, in supervised learning, each pattern belongs to a certain predefined class. A class can be seen as a decision that has to be made. All the observations combined with their class labels are known as a data set. When a new observation is received, that observation is classified based on previous experience. For example, training the classifier of step 760 may include training at least one of a Support Vector Machine (SVM) classifier, an Artificial Neural Network (ANN) classifier, a Decision Tree classifier, a Bayes classifier, or any combination thereof by the training data of oil palm trees and non-target objects in FIG. 9. For another example, training the classifier of step 760 may include training at least one of a Support Vector Machine (SVM) classifier, an Artificial Neural Network (ANN) classifier, a Decision Tree classifier, a Bayes classifier, or any combination thereof by the training data of oil palm trees in FIG. 9(a) and non-target objects that are randomly generated.

Step 770 may include classifying the one or more regional aerial images in step 730 by the trained classifier in step 760 in accordance with the one or more feature vectors in step 740. For example, classifying the regional aerial images of step 770 may include classifying the one or more regional aerial images of the detected oil palm trees in step 730 by the trained SVM classifier in step 760 in accordance with the one or more feature vectors extracted by Gabor filter and GLCM in step 740. For another example, classifying the regional aerial images of step 770 may include classifying the one or more regional aerial images of the detected oil palm trees in step 730 by the trained ANN classifier in step 760 in accordance with the one or more feature vectors extracted by LBP and HOG in step 740. For another example, classifying the regional aerial images of step 770 may include classifying the one or more regional aerial images of the detected oil palm trees in step 730 by the trained ANN classifier in step 760 in accordance with the one or more feature vectors extracted by Gabor filter, GLCM, LBP, and HOG in step 740. Method 700 may include any combinations of the aforementioned textual extraction algorithms and the classifiers.

Figure 10:
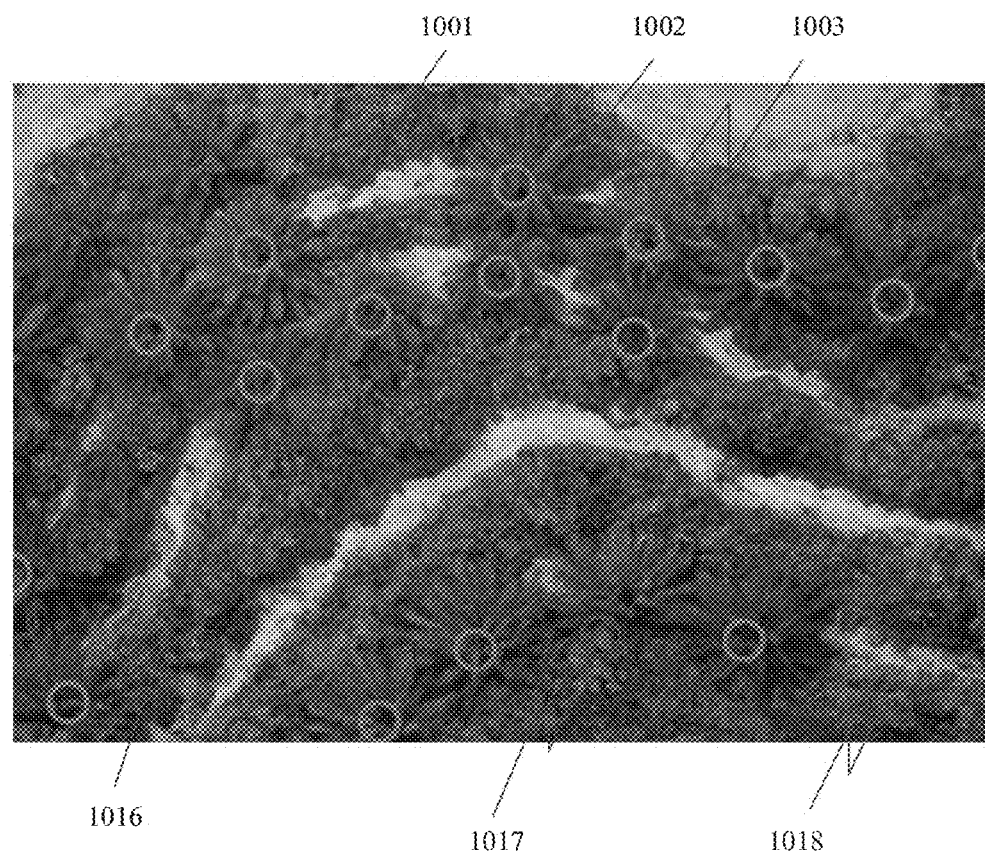
FIG. 10 is an illustration (in color) of a partial enlarged view of the exemplary aerial image of the area marked the classified results at the positions of detected target objects in accordance with the exemplary method for automatic object detection in FIG. 7, according to a disclosed embodiment.

The classification results by a classifier may include two kinds of results or multiple kinds of results. For example, an SVM classifier may output "0" when a regional aerial image of the detected oil palm tree is classified as the same kind of objects in FIG. 9(*a*) based on its feature vector. The SVM classifier may output "1" when a regional aerial image of the detected oil palm tree is classified as the same kind of objects in FIG. 9(*b*) based on its feature vector. FIG. 10 is an illustration of a partial enlarged view of the exemplary aerial image of the area marked the classified results at the positions of detected target objects in accordance with the exemplary method for automatic object detection in FIG. 7, according to a disclosed embodiment. Regional aerial images marked by pink circles at positions 1001, 1002, 1003 are classified as the target oil palm trees. Regional aerial images marked by blue circles at positions 1016, 1017, 1018 are classified as the non-target objects.

Step 780 may include recognizing the target objects among the one or more regional aerial images based on the classified results. For example, recognizing the target objects of step 780 may include recognizing the oil palm trees among the one or more regional aerial images of the detected oil palm trees in step 730 based on the classified results in step 770. For example, the regional aerial images of the detected oil palm trees 1001, 1002, 1003 in FIG. 10 may be classified as the same of objects in FIG. 9(*a*) and the outputs from the SVM classifier for them may be all "0s." Accordingly, recognizing the target objects of step 780 may include recognizing the regional aerial images of the detected oil palm trees 1001, 1002, 1003 as the target oil palm trees based on their classification results, "0s." For example, the regional aerial images of the detected oil palm trees 1016, 1017, 1018 in FIG. 10 may be classified as the same of objects in FIG. 9(*b*) and the outputs from the SVM classifier for them may be all "1s." Accordingly, recognizing the target objects of step 780 may include recognizing the regional aerial images of the detected oil palm trees 1016, 1017, 1018 as the non-target objects based on their classification results, "1s."

In some embodiments, method 700 may include a step 790 acquiring one or more positions of the recognized target objects in step 780. For example, acquiring the positions of the recognized target objects of step 790 may include acquiring the positions of the recognized oil palm trees 1001, 1002, 1003 on the aerial image of the area. In FIG. 10, the recognized oil palm trees are marked by pink circles in the aerial image of the area while the recognized non-target objects are marked by blue circles in the aerial image of the area in the figure. Acquiring the positions of the recognized target objects of step 790 may include acquiring the positions of the recognized oil palm trees marked by pink circles in the aerial image of the area.

In some embodiments, step 790 may further include displaying the one or more positions of the recognized target objects on the aerial image of the area or a map. For example, displaying the recognized target objects of step 790 may include displaying the positions of the one or more recognized oil palm trees 1001, 1002, 1003 on the aerial image of the area. For another example, displaying the recognized target objects of step 790 may include displaying the positions of the one or more recognized oil palm trees on a map of the area based on the association or correspondence between the positions on the aerial image of the area and the map of the area (not shown). For example, a position on the aerial image of the area may be associated with a set of longitude, latitude, and elevation. In some embodiment, displaying the recognized target objects of step 790 may include obtaining the recognized oil palm trees' sets of longitudes, latitudes, and elevations, and displaying the recognized oil palm trees on a map based on the sets of longitudes, latitudes, and/or elevations. For example, displaying the recognized oil palm trees of step 790 may include displaying the recognized oil palm trees on a geographic information system (GIS) map based on the sets of longitudes and latitudes. For another example, displaying the recognized oil palm trees of step 790 may include displaying the recognized oil palm trees on a map based on the sets of longitudes, latitudes, and elevations, such as on a 3D GIS map.

In some embodiments, step 790 may include calculating the number of the recognized target objects. For example, step 790 may include calculating the recognized oil palm trees.

Figure 11:
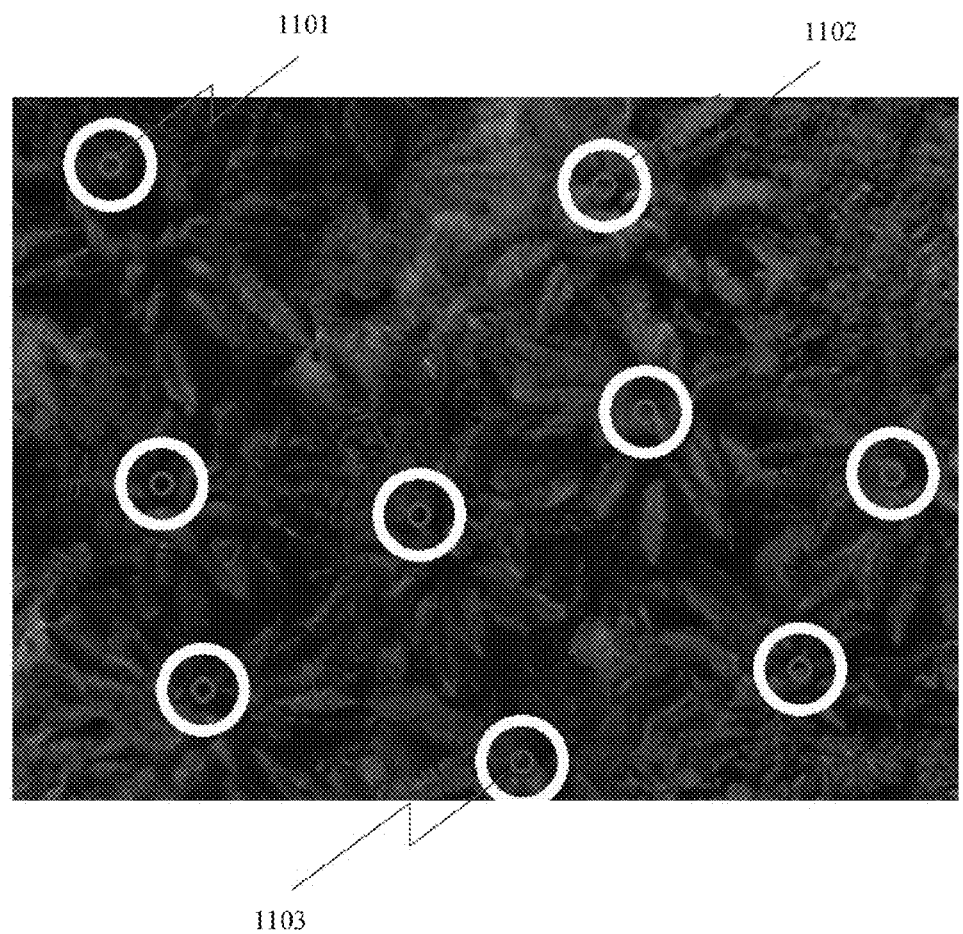
FIG. 11 is an illustration (in color) of a partial enlarged view of the exemplary aerial image of the area marked with the positions of the correctly detected and recognized exemplary target objects in accordance with the exemplary method for automatic object detection in FIG. 7, according to a disclosed embodiment.

FIG. 11 is an illustration of a partial enlarged view of the exemplary aerial image of the area marked with the positions of the correctly detected and recognized exemplary target objects in accordance with the exemplary method for automatic object detection in FIG. 7, according to a disclosed embodiment. When Ground Truth information of the target objects is available, it is possible to estimate the accuracy of the aforementioned object detection methods. The white circles 1101, 1102, 1103 in FIG. 11 are exemplary correct detected and recognized oil palm trees.

Figure 12:
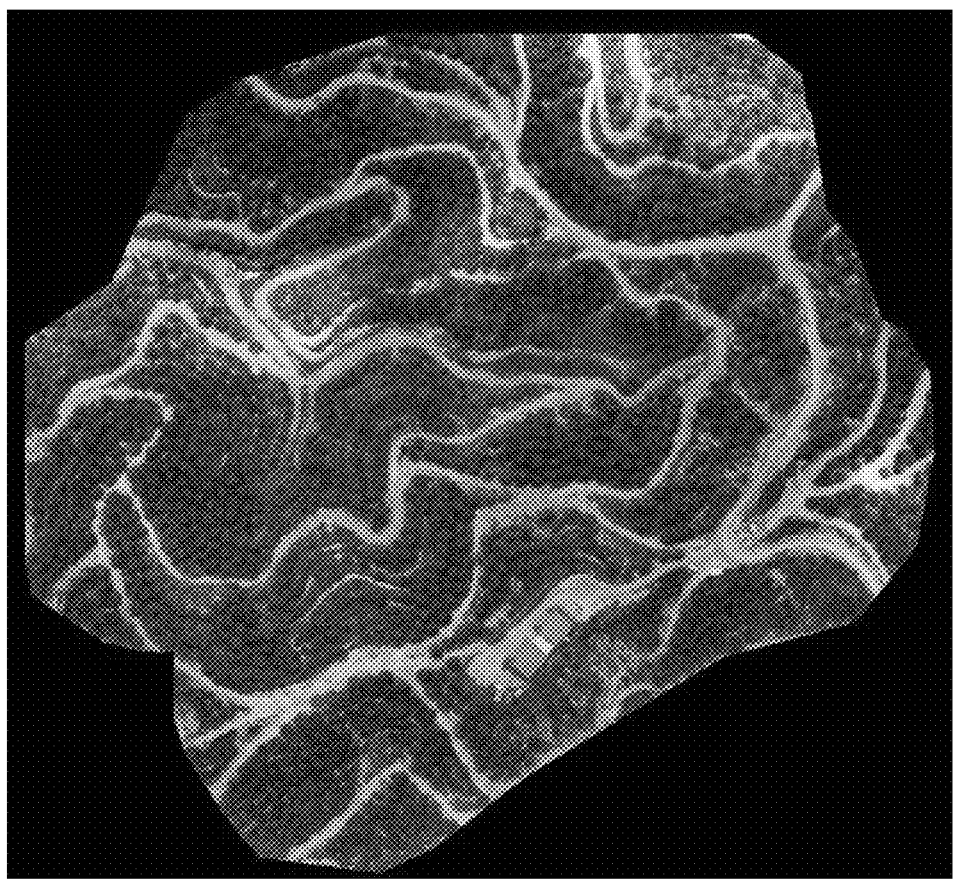
FIG. 12 is an illustration (in color) of the exemplary aerial image of the area marked the classification results at the positions of the detected and classified exemplary target objects in accordance with the exemplary method for automatic object detection in FIG. 7, according to a disclosed embodiment.

FIG. 12 is an illustration of the exemplary aerial image of the area marked the classification results at the positions of the detected and classified exemplary target objects in accordance with the exemplary method for automatic object detection in FIG. 7, according to a disclosed embodiment. In the figure, regional aerial images marked by pink circles are recognized as the target oil palm trees, and regional aerial images marked by blue circles are classified as the non-target objects. In an embodiment, the precision and recall of the object detection from aerial imagery may achieve 90.6% and 83.4% respectively while MB-LBP is adopted for feature extraction and the ground sample distance of the images is 3 centimeters.

Another aspect of the present disclosure is directed to a method for detecting objects from aerial imagery performed by one or more integrated circuits, one or more field programmable gate arrays, one or more processors or controllers executing instructions that implement the method, or any combination thereof. The method may include, but not limited to, all the aforementioned methods and embodiments. In some embodiments, a part of steps in the aforementioned methods or embodiments may be performed remotely or separately. In some embodiments, the method may be performed by one or more distributed systems.

Figure 13:
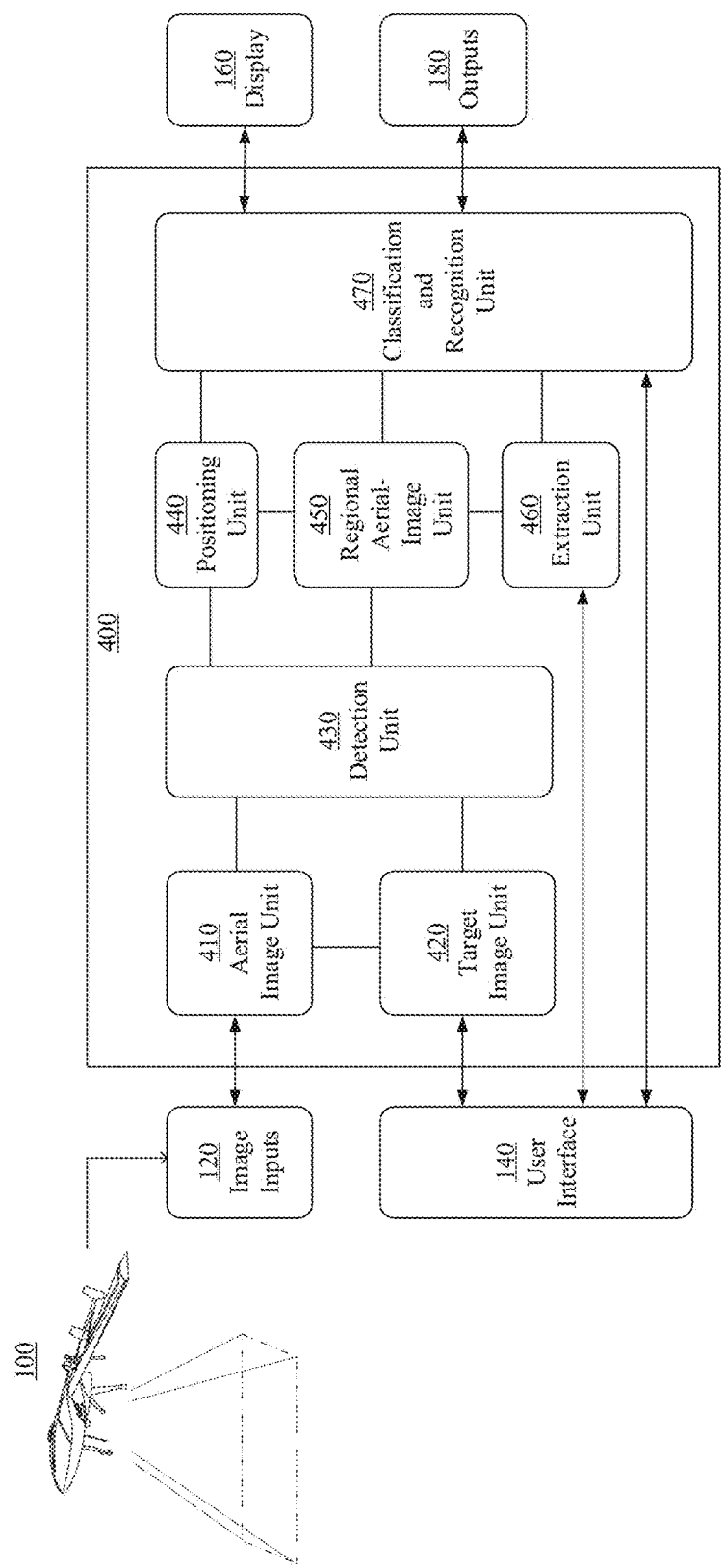
FIG. 13 is a block diagram of an exemplary system for automatic object detection from aerial imagery, according to a disclosed embodiment.

Yet another aspect of the present disclosure is directed to a system for detecting objects from aerial imagery. FIG. 13 is a block diagram of an exemplary system 400 for automatic object detection from aerial imagery, according to a disclosed embodiment. Automatic objection detection system 400 may include an aerial image unit 410 configured to obtain a DSM image of an area, a target image unit 420 configured to obtain a DSM image of a target object, and a detection unit 430 configured to detect the target object in the area based on the DSM images of the area and the target object.

Aerial image unit 410 may include an appropriate type of hardware, such as integrated circuits and field programmable gate array, or software, such as a set of instructions, a subroutine, or a function (i.e. a functional program) executable on a processor or controller, to carry out the aforementioned operations in step 220. Aerial image unit 410 may be configured to obtain a DSM image of an area. In some embodiments, aerial image unit 410 may be communicatively coupled to an image inputs 120. Image input 120 may provide aforementioned various images inputs to aerial image unit 410. For example, image input 120 may receive aerial images of the area, DSMs of the area, and/or DEMs of the area from UAV 100, a drone, an aircraft, a helicopter, a balloon, or a satellite, and transmit these images, DSMs, and/or DEMs of the area to aerial image unit 410. In some embodiments, aerial image unit 410 may also be communicatively coupled to detection unit 430. Aerial image unit 410 may be configured to provide the DSM image of the area and aerial images of the area or parts of the area to detection unit 430. In some embodiments, aerial image unit 410 may also be communicatively coupled to target image unit 420. Aerial image unit 410 may be configured to send the received target images from image inputs 120 to target image unit 420.

Target image unit 420 may include an appropriate type of hardware, such as integrated circuits and field programmable gate array, or software, such as a set of instructions, a subroutine, or a function (i.e. a functional program) executable on a processor or controller, to carry out the aforementioned operations in step 240. Target image unit 420 may be configured to obtain a DSM image of a target object. In some embodiments, target image unit 420 may also be communicatively coupled to a user interface 140. Target image unit 420 may be configured to receive target images from user interface 140. In some embodiments, target image unit 420 may be configured to receive a selection of the target images from user interface 140. In some embodiments, target image unit 420 may also be communicatively coupled to detection unit 430. Target image unit 420 may be configured to send target images to detection unit 430 for object detection.

Detection unit 430 may include an appropriate type of hardware, such as integrated circuits and field programmable gate array, or software, such as a set of instructions, a subroutine, or a function (i.e. a functional program) executable on a processor or controller, to carry out the aforementioned operations in step 260. Detection unit 430 may be configured to detect the target object in the area based on the DSM images of the area and the target object from aerial image unit 410 and target image unit 420. In some embodiments, detection unit 430 may be configured to acquire one or more positions of the detected target objects as the aforementioned operations in step 290. In some embodiments, detection unit 430 may also be communicatively coupled to a display 160. Detection unit 430 may be configured to display the one or more positions of the detected target objects on the aerial image of the area or a map on display 160 as the aforementioned operations in step 290. In some embodiments, detection unit 430 may be configured to calculate the number of the detected target objects as the aforementioned operations in step 290. In some embodiments, detection unit 430 may also be communicatively coupled to an outputs 180. Detection unit 430 may be configured to send the calculated number of the detected target objects to outputs 180.

In some embodiments, automatic objection detection system 400 may include aerial image unit 410, target image unit 420, detection unit 430, a positioning unit 440, a regional aerial-image unit 450, an extraction unit 460, and a classification and recognition unit 470.

Aerial image unit 410 may be further configured to obtain the aerial image of the area corresponding to the DSM image of the area as the aforementioned operations in step 710.

Positioning unit 440 may include an appropriate type of hardware, such as integrated circuits and field programmable gate array, or software, such as a set of instructions, a subroutine, or a function (i.e. a functional program) executable on a processor or controller, to carry out the aforementioned operations in step 720. Positioning unit 440 may be configured to acquire one or more positions of the detected target objects on the aerial image of the area. In some embodiments, positioning unit 440 may be communicatively coupled to detection unit 430. Positioning unit 440 may be configured to receive the detected target objects from detection unit 430, and acquire one or more positions of the detected target objects on the aerial image of the area. In some embodiments, positioning unit 440 may also be communicatively coupled to regional aerial-image unit 450. Positioning unit 440 may be configured to send the acquired positions of the detected target objects to regional aerial-image unit 450. In some embodiments, positioning unit 440 may also be communicatively coupled to classification and recognition unit 470. Positioning unit 440 may be configured to send the acquired positions of the detected target objects to classification and recognition unit 470.

Regional aerial-image unit 450 may include an appropriate type of hardware, such as integrated circuits and field programmable gate array, or software, such as a set of instructions, a subroutine, or a function (i.e. a functional program) executable on a processor or controller, to carry out the aforementioned operations in step 730. Regional aerial-image acquisition unit may be configured to acquire one or more regional aerial images at the one or more positions of the detected target objects. In some embodiments, regional aerial-image unit 450 may also be communicatively coupled to detection unit 430. Regional aerial-image unit 450 may be configured to receive the detected target objects and/or aerial images of the area from detection unit 430. In some embodiments, regional aerial-image unit 450 may also be communicatively coupled to extraction unit 460. Regional aerial-image unit 450 may be configured to send the acquired regional aerial images at the one or more positions of the detected target objects to extraction unit 460. In some embodiments, regional aerial-image unit 450 may also be communicatively coupled to classification and recognition unit 470. Regional aerial-image unit 450 may be configured to send the acquired regional aerial images at the one or more positions of the detected target objects to classification and recognition unit 470.

Extraction unit 460 may include an appropriate type of hardware, such as integrated circuits and field programmable gate array, or software, such as a set of instructions, a subroutine, or a function (i.e. a functional program)

executable on a processor or controller, to carry out the aforementioned operations in step 740. Extraction unit 740 may be configured to extract one or more textual features from the one or more regional aerial images as one or more feature vectors. In some embodiments, extraction unit 460 may also be communicatively coupled to regional aerial-image unit 450. Extraction unit 460 may be configured to receive the acquired regional aerial images at the one or more positions of the detected target objects from regional aerial-image unit 450. In some embodiments, extraction unit 460 may also be communicatively coupled to user interface 140. Extraction unit 460 may be configured to receive user input or selection of extraction algorithms from user interface 140. In some embodiments, Extraction unit 460 may also be communicatively coupled to classification and recognition unit 470. Extraction unit 460 may be configured to send the extracted one or more feature vectors to classification and recognition unit 470.

Classification and recognition unit 470 may include an appropriate type of hardware, such as integrated circuits and field programmable gate array, or software, such as a set of instructions, a subroutine, or a function (i.e. a functional program) executable on a processor or controller, to carry out the aforementioned operations in steps 750, 760, 770, and 780. In some embodiments, classification and recognition unit 470 may also be communicatively coupled to user interface 140. Classification and recognition unit 470 may be configured to obtain a plurality of training data from user interface 140. In some embodiments, classification and recognition unit 470 may also be communicatively coupled to positioning unit 440. Classification and recognition unit 470 may be configured to receive the acquired positions of the detected target objects from positioning unit 440. In some embodiments, classification and recognition unit 470 may also be communicatively coupled to regional aerial-image unit 450. Classification and recognition unit 470 may be configured to receive the acquired regional aerial images at the one or more positions of the detected target objects from regional aerial-image unit 450. In some embodiments, classification and recognition unit 470 may also be communicatively coupled to extraction unit 460. Classification and recognition unit 470 may be configured to receive the extracted one or more feature vectors from extraction unit 460.

Classification and recognition unit 470 may be configured to obtain a plurality of training data, the training data including a plurality of aerial images of the same kind of objects as the target object. Classification and recognition unit 470 may be further configured to train a classifier based on the plurality of training data. Classification and recognition unit 470 may be further configured to classify the one or more regional aerial images by the trained classifier in accordance with the one or more feature vectors. Classification and recognition unit 470 may be further configured to recognize the target objects among the one or more regional aerial images based on the classified results.

In some embodiments, classification and recognition unit 470 may be further configured to acquire one or more positions of the recognized target objects as the aforementioned operations in step 790. In some embodiments, classification and recognition unit 470 may also be communicatively coupled to a display 160. Classification and recognition unit 470 may be configured to display the one or more positions of the recognized target objects on the aerial image of the area or a map on display 160 as the aforementioned operations in step 790. In some embodiments, classification and recognition unit 470 may be configured to calculate the number of the detected target objects as the aforementioned operations in step 790. In some embodiments, classification and recognition unit 470 may also be communicatively coupled to an outputs 180. Classification and recognition unit 470 may be configured to send the calculated number of the recognized target objects to outputs 180.

It will be apparent to those skilled in the art that various modifications and variations can be made to the disclosed methods and systems for detecting objects from aerial imagery. Other embodiments will be apparent to those skilled in the art from consideration of the specification and practice of the disclosed methods and systems for detecting objects from aerial imagery. It is intended that the specification and examples be considered as exemplary only, with a true scope being indicated by the following claims and their equivalents.

What is claimed is:

1. A non-transitory computer-readable medium storing instructions which, when executed, cause one or more processors to perform operations for detecting objects from aerial imagery, the operations comprising:
   obtaining a Digital Surface Model (DSM) image of an area;
   obtaining one or more DSM images representing one kind of target objects; and
   detecting at least one of the kind of target objects in the area based on one or more matches between the one or more DSM images and the DSM image of the area.

2. The non-transitory computer-readable medium of claim 1,
   wherein the one or more DSM images are obtained based on at least one of
      shape of target objects in the one or more DSM images, or
      contrast of the one or more DSM images.

3. The non-transitory computer-readable medium of claim 1, wherein the operations further comprise:
   reducing resolutions of the DSM image of the area and the one or more DSM images before detecting at least one of the kind of target objects.

4. The non-transitory computer-readable medium of claim 1,
   wherein obtaining the DSM image of the area further includes:
      identifying one or more target subareas on the DSM image of the area;
      enhancing contrast of the one or more target subareas; and
   wherein detecting at least one of the kind of target objects includes:
      detecting at least one of the kind of target objects based on the enhanced DSM image of the area and the one or more DSM images.

5. The non-transitory computer-readable medium of claim 4, wherein identifying the one or more target subareas includes:
   obtaining a color aerial image of the area corresponding to the DSM image of the area and one or more color aerial images corresponding to the one or more DSM images;
   identifying the one or more target subareas based on the color aerial image of the area and the one or more color images.

6. The non-transitory computer-readable medium of claim 1, wherein detecting at least one of the kind of target objects in the area further includes:

calculating match rates between the one or more DSM images and one or more DSM sub-images of the area; and determining whether the one or more DSM sub-images of the area are one or more target objects based on the match rates.

7. The non-transitory computer-readable medium of claim 6, wherein determining whether the one or more DSM sub-images of the area are one or more target objects includes determining based on at least one of:
a match rate of a DSM sub-image is a maximum among other DSM sub-images within a first distance; or
a height of a DSM sub-image is higher than a height of a lowest position within a second distance by a height threshold.

8. The non-transitory computer-readable medium of claim 1, wherein obtaining the DSM image of the area includes:
collecting the DSM of the area by an Unmanned Aerial Vehicle, a drone, an aircraft, a helicopter, a balloon, or a satellite; and
receiving the DSM of the area from the Unmanned Aerial Vehicle, the drone, the aircraft, the helicopter, the balloon, or the satellite.

9. The non-transitory computer-readable medium of claim 1, wherein the operations further comprise:
acquiring one or more positions of the detected at least one of the kind of target objects.

10. The non-transitory computer-readable medium of claim 1, wherein the operations further comprise:
calculating a number of the detected at least one of the kind of target objects.

11. The non-transitory computer-readable medium of claim 1, wherein the operations further comprise:
acquiring one or more regional aerial images at the detected at least one of the kind of target objects;
obtaining a classifier;
classifying the one or more regional aerial images by the classifier; and
recognizing the kind of target objects among the one or more regional aerial images based on the classified results.

12. The non-transitory computer-readable medium of claim 11, wherein obtaining a classifier further includes:
obtaining a plurality of training data; and
training the classifier based thereon.

13. The non-transitory computer-readable medium of claim 12, wherein the plurality of training data includes:
one or more aerial images representing the kind of target objects; and
one or more aerial images representing non-target objects.

14. The non-transitory computer-readable medium of claim 13, wherein classifying the one or more regional aerial images further includes:
extracting one or more feature vectors from the one or more regional aerial images; and
classifying the one or more regional aerial images in accordance with the one or more feature vectors.

15. The non-transitory computer-readable medium of claim 14, wherein extracting the one or more feature vectors includes:
extracting based on Gabor filter, Gray-Level Co-occurrence Matrix (GLCM), Local Binary Pattern (LBP), Histograms of Oriented Gradients (HOG), first-order feature description, second-order feature description, or any combination thereof.

16. The non-transitory computer-readable medium of claim 11,
wherein the one or more regional aerial images are acquired in a first color space and transferred into a second color space.

17. The non-transitory computer-readable medium of claim 14,
wherein acquiring the one or more regional aerial images includes:
acquiring the one or more regional aerial images in a first color space; and
transferring the one or more regional aerial images in the first color space to one or more regional aerial images in a second color space, and
wherein extracting the one or more feature vectors includes extracting from at least one of:
the one or more regional aerial images in the first color space; or
the one or more regional aerial images in the second color space.

18. The non-transitory computer-readable medium of claim 17,
wherein the first and the second color spaces include RGB, grayscale, HSI, L*a*b, multi-spectral space, or any combination thereof.

19. The non-transitory computer-readable medium of claim 11, wherein acquiring the one or more regional aerial images includes:
obtaining a plurality of aerial images of parts of the area;
stitching the plurality of aerial images of parts of the area to obtain the aerial image of the area; and
acquiring the one or more regional aerial images from the aerial image of the area.

20. The non-transitory computer-readable medium of claim 11,
wherein the classifier includes a Support Vector Machine (SVM) classifier, an Artificial Neural Network (ANN) classifier, a Decision Tree classifier, a Bayes classifier, or any combination thereof.

21. A method for detecting objects from aerial imagery performed by one or more integrated circuits, one or more field programmable gate arrays, one or more processors or controllers executing instructions that implement the method, or any combination thereof, the method comprising:
obtaining a Digital Surface Model (DSM) image of an area;
obtaining one or more DSM images representing one kind of target objects; and
detecting at least one of the kind of target objects in the area based on one or more matches between the one or more DSM images and the DSM image of the area.

22. The method of claim 21,
wherein the one or more DSM images are obtained based on at least one of
shape of target objects in the one or more DSM images, or
contrast of the one or more DSM images.

23. The method of claim 21, further comprising:
reducing resolutions of the DSM image of the area and the one or more DSM images before detecting at least one of the kind of target objects.

24. The method of claim 21,
wherein obtaining the DSM image of the area further includes:
identifying one or more target subareas on the DSM image of the area;
enhancing contrast of the one or more target subareas; and wherein detecting at least one of the kind of target objects includes:
    detecting at least one of the kind of target objects based on the enhanced DSM image of the area and the one or more DSM images.

25. The method of claim 24, wherein identifying the one or more target subareas includes:
    obtaining a color aerial image of the area corresponding to the DSM image of the area and one or more color aerial images corresponding to the one or more DSM images;
    identifying the one or more target subareas based on the color aerial image of the area and the one or more color images.

26. The method of claim 21, wherein detecting at least one of the kind of target objects in the area further includes:
    calculating match rates between the one or more DSM images and one or more DSM sub-images of the area; and
    determining whether the one or more DSM sub-images of the area are one or more target objects based on the match rates.

27. The method of claim 26, wherein determining whether the one or more DSM sub-images of the area are one or more target objects includes determining based on at least one of:
    a match rate of a DSM sub-image is a maximum among other DSM sub-images within a first distance; or
    a height of a DSM sub-image is higher than a height of a lowest position within a second distance by a height threshold.

28. The method of claim 21, wherein obtaining the DSM image of the area includes:
    collecting the DSM of the area by an Unmanned Aerial Vehicle, a drone, an aircraft, a helicopter, a balloon, or a satellite; and
    receiving the DSM of the area from the Unmanned Aerial Vehicle, the drone, the aircraft, the helicopter, the balloon, or the satellite.

29. The method of claim 21, further comprising:
acquiring one or more positions of the detected at least one of the kind of target objects.

30. The method of claim 21, further comprising:
calculating a number of the detected at least one of the kind of target objects.

31. The method of claim 21, further comprising:
acquiring one or more regional aerial images at the detected at least one of the kind of target objects;
obtaining a classifier;
classifying the one or more regional aerial images by the classifier; and
recognizing the kind of target objects among the one or more regional aerial images based on the classified results.

32. The method of claim 31, wherein obtaining a classifier further includes:
    obtaining a plurality of training data; and
    training the classifier based thereon.

33. The method of claim 32, wherein the plurality of training data includes:
    one or more aerial images representing the kind of target objects; and
    one or more aerial images representing non-target objects.

34. The method of claim 33, wherein classifying the one or more regional aerial images further includes:
    extracting one or more feature vectors from the one or more regional aerial images; and
    classifying the one or more regional aerial images in accordance with the one or more feature vectors.

35. The method of claim 34, wherein extracting the one or more feature vectors includes:
    extracting based on Gabor filter, Gray-Level Co-occurrence Matrix (GLCM), Local Binary Pattern (LBP), Histograms of Oriented Gradients (HOG), first-order feature description, second-order feature description, or any combination thereof.

36. The method of claim 31,
wherein the one or more regional aerial images are acquired in a first color space and transferred into a second color space.

37. The method of claim 34,
wherein acquiring the one or more regional aerial images includes:
    acquiring the one or more regional aerial images in a first color space; and
    transferring the one or more regional aerial images in the first color space to one or more regional aerial images in a second color space, and
wherein extracting the one or more feature vectors includes extracting from at least one of:
    the one or more regional aerial images in the first color space; or
    the one or more regional aerial images in the second color space.

38. The method of claim 37,
wherein the first and the second color spaces include RGB, grayscale, HSI, L*a*b, multi-spectral space, or any combination thereof.

39. The method of claim 31, wherein acquiring the one or more regional aerial images includes:
    obtaining a plurality of aerial images of parts of the area;
    stitching the plurality of aerial images of parts of the area to obtain the aerial image of the area; and
    acquiring the one or more regional aerial images from the aerial image of the area.

40. The method of claim 31,
wherein the classifier includes a Support Vector Machine (SVM) classifier, an Artificial Neural Network (ANN) classifier, a Decision Tree classifier, a Bayes classifier, or any combination thereof.

41. A system for detecting objects from aerial imagery, the system comprising:
    an aerial image unit, implemented by one or more processor or one or more circuits, that obtains a DSM image of an area;
    a target image unit, implemented by the one or more processor or the one or more circuits, that obtains one or more DSM images representing one kind of target objects; and
    a detection unit, implemented by the one or more processor or the one or more circuits, that detects at least one of the kind of target objects in the area based on one or more matches between the one or more DSM images and the DSM image of the area.

42. The system of claim 41, further comprising:
    a regional aerial-image acquisition unit, implemented by one or more processor or one or more circuits, that acquires one or more regional aerial images at the detected at least one of the kind of target objects;
    a classification and recognition unit, implemented by the one or more processor or the one or more circuits, that:
        obtains a classifier;
        classifies the one or more regional aerial images by the classifier; and recognizes the kind of target objects among the one or more regional aerial images based on the classified results.

\* \* \* \* \*